(12) United States Patent
Forsman et al.

(10) Patent No.: US 8,182,121 B2
(45) Date of Patent: May 22, 2012

(54) COVER WITH ATTACHMENT PORTION AND FLEXIBLE BODY

(75) Inventors: Jonas Karl Forsman, Gothenburg (SE); Lars S E Wettre, Gothenburg (SE)

(73) Assignee: CableCup AB, Uddevalla (SE)

( * ) Notice: Subject to any disclaimer, the term of this patent is extended or adjusted under 35 U.S.C. 154(b) by 0 days.

(21) Appl. No.: 12/984,111

(22) Filed: Jan. 4, 2011

(65) Prior Publication Data

US 2011/0157902 A1 Jun. 30, 2011

Related U.S. Application Data

(63) Continuation of application No. PCT/SE2009/050894, filed on Jul. 10, 2009.

(51) Int. Cl.
*F21V 21/008* (2006.01)
*F21V 21/00* (2006.01)

(52) U.S. Cl. ........ 362/404; 362/147; 362/407; 362/450; 362/457; 362/453

(58) Field of Classification Search .................. 362/147, 362/391, 396, 404, 407, 450, 451, 453, 457
See application file for complete search history.

(56) References Cited

U.S. PATENT DOCUMENTS

| | | | | | |
|---|---|---|---|---|---|
| 2,183,647 | A | * | 12/1939 | Holden | ............... 362/217.12 |
| 2,563,946 | A | * | 8/1951 | Law | ............... 222/538 |
| 2,739,222 | A | * | 3/1956 | Gard | ............... 362/410 |
| 2,914,104 | A | * | 11/1959 | Jocelyn | ............... 220/783 |

FOREIGN PATENT DOCUMENTS

| | | |
|---|---|---|
| DE | 202007005532 | 8/2007 |
| DE | 102006022609 | 11/2007 |
| FR | 2117772 | 7/1972 |
| FR | 2474144 | 7/1981 |

OTHER PUBLICATIONS

International Search Report mailed on Oct. 30, 2009 in connection with PCT Application No. PCT/SE2009/050894.
Written Opinion mailed on Oct. 30, 2009 in connection with PCT Application No. PCT/SE2009/050894.

\* cited by examiner

*Primary Examiner* — Stephen F Husar
*Assistant Examiner* — James Cranson, Jr.
(74) *Attorney, Agent, or Firm* — Gesmer Updegrove LLP

(57) ABSTRACT

The present invention relates to a device for covering an area, which device comprises an attachment portion and a body. Said body is designed partly spherical made of a flexible material and designed as a cover with a wall essentially extending around the entire cover which has an open end portion. Said wall extends from an end point to said end portion, which end portion is configured to assume a first position with regard to a plane in said end point of said cover and a second position by folding said wall and displacing said end portion past said plane.

12 Claims, 4 Drawing Sheets

COVER WITH ATTACHMENT PORTION AND FLEXIBLE BODY

The present application is a Continuation of PCT Application No. PCT/SE2009/050894, filed on Jul. 10, 2009, that claims priority to Swedish Application No, SE 0801675-0, filed on Jul. 11, 2008. Both applications are incorporated herein by reference in their entireties.

TECHNICAL AREA

The present invention generally relates to a cover and in particular to a cover fitted with an attachment device for electric conductors or similar for suspension of electric equipments, such as lamps or fittings.

BACKGROUND

Lamps and fittings are usually hanged up from a hook in the vicinity of an electric contact of a ceiling. Assembled on the lamp or for subsequent installation are covers, or also called lamp tops, which is attached to the end of the electric wire on the other end of which the lamp socket is mounted.

FIG. 1 shows a cross-section of a cover 10 and the attachment device according to prior art. The cover consists of a substantially conical body 11 with an upper opening 12 and a lower opening 13. Through the lower opening 13 the cable 14 extends in one end of which a lamp socket (not shown) is connected. A loop 15 is mounted on the cable, which can be hung on a hook 16 attached to the ceiling. A screw 17 is provided at the lower opening, which allows the cover to be secured on the cable. Generally the cover is made of a hard material, such as plastic or light metal.

When assembling, the screw 17 is unscrewed which allows the cover 10 to move along the cable and enables access to the hook. Then the screw is fixed with the cover close to or in contact with the ceiling surface.

Problems with these covers include:
These do not seal against the ceiling (prevented by the extra cable, contact, hook, suspension.)
Difficult to have space for cable in the cup (modern cables are thicker and more rigid than the simpler and ungrounded cables used in earlier.)
Does not allow installation of lamps close to the ceiling/ body when traditional copper requires margin between the ceiling and the lamp for installing it. (Often creates problem close to the doors).
Difficult to adjust lamp vertically. Especially, it is difficult to change the height after installation.
Manufactured usually in at least 3 parts. (Cup, suspension washer, screw for locking the of the cup)
Usually requires tools for installation.
Usually are perceived as unnecessary because of affecting the overall impression of the lamp.

DE 102006022609 comprises a cylindrical body, which has a bottom part of harder material. Due its cylindrical design, it cannot be folded completely because of tensions which may arise in the material. In addition it may only be folded down to the harder part. This does not allow a simple handling of the suspension and because of material's elastic properties and the tensions which may arise because of the material and its form, the folded part will revert to its unfolded form, which means that the user must hold the folded part by himself or by help of someone else and thus the entire simplicity with suspension is reduced.

SUMMARY

The object of the present invention is to provide a cover which is easy to produce, install, and provides secure suspension and good fitting.

Advantages of invention include, among other things:
Tightly sealing to the ceiling with good fit,
Easy to install, which does not requires expertise or tools.
Easy to adjust vertically on the cable and thus the lamp, even after or when the lamps height need to be adjusted temporary.
Easy to provide extra cord space thanks to a wide profile which eliminates the need to bend cables very much.
Permits fitting of lamp closer to the cover.
Manufacturing may be in one part, e.g. by means of double injection-mould (two materials). Thanks to the production adapted design no moving tool parts are needed.
Discreet design that harmonizes with the ceiling.

In order to achieve these objects a device is provided for covering an area. The device comprises an attachment portion and a body. The body is designed substantially a section of a sphere made of a flexible material and formed as a cover with said wall essentially extending around the entire cover which has an open end portion. The wall extends from an end point to said end portion, which end portion is configured to assume a first position with regard to a plane in said end point of said cover and a second position by folding said wall and displacing said end portion past said plane.

Preferably, the material is one or several of rubber, plastic, polymers, textiles, silicone polymer or elastic flexible metal.

The device also comprises an attachment part. The attachment part comprises a loop. The attachment part comprises a fixing portion, which is arranged to hold a cable by means of friction. The loop is arranged to interact with a hook for suspension.

The body may assume a first and a second operational positions, and said first and second operational positions are substantially inverted.

The device is arranged as a cover or a lamp top.

The invention also relates to a method for covering an area provided with an attachment by means of the aforementioned device. According to the method, the body is folded past said plane. The attachment part on said device is attached to said attachment and said body is folded back to an initial position.

The invention also relates to a method for suspending an electric device by means of the aforementioned device. According to the method the body is folded close to or past the plane.

The attachment part on said device is attached to an attachment and a wire of said electric device is inserted through a holder and fixed, and said body is folded back to an initial position.

BRIEF DESCRIPTION OF THE DRAWINGS

In the following the invention will be described with reference to an exemplary embodiment illustrated in drawings, in which.

DETAILED DESCRIPTION

Figure 1:
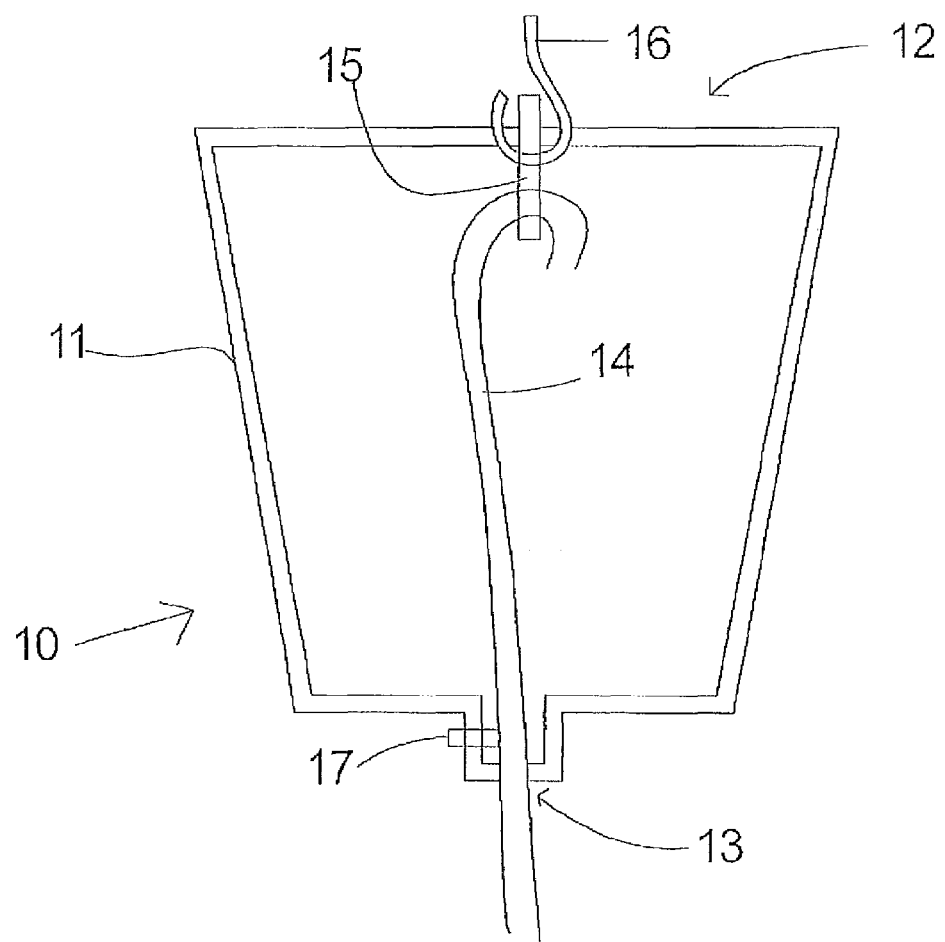
FIG. 1 shows an embodiment according to prior art.
Figure 2:
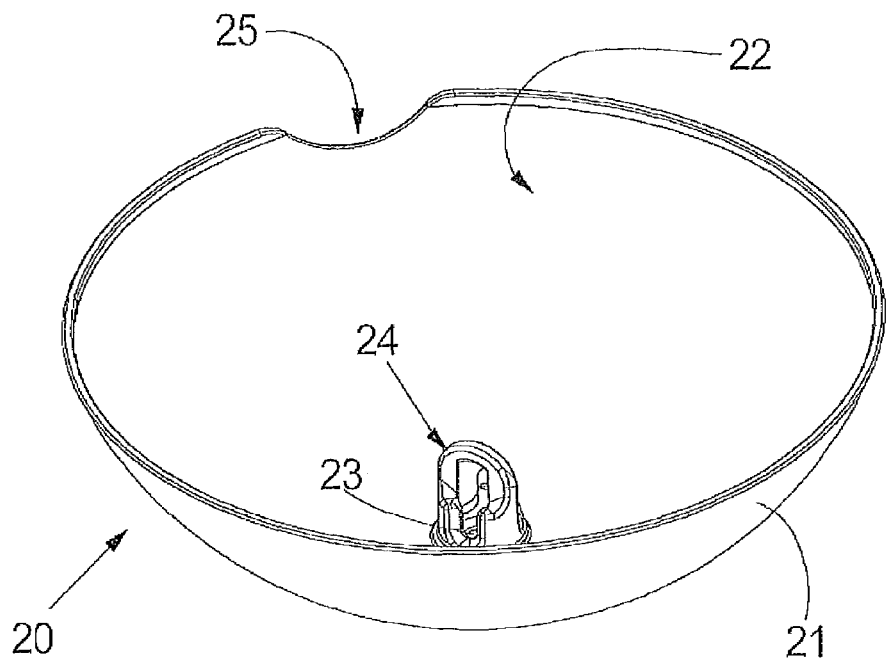
FIG. 2 shows an embodiment of a cover according to the present invention in perspective.

FIG. 2 shows in perspective a cover 20 in accordance with the invention. The cover 20 includes an essentially half or partly spherical body 21 with an open side 22 and an opening 23 for letting through the cable and an attachment arrangement 24.

Figures 3A, 3B:
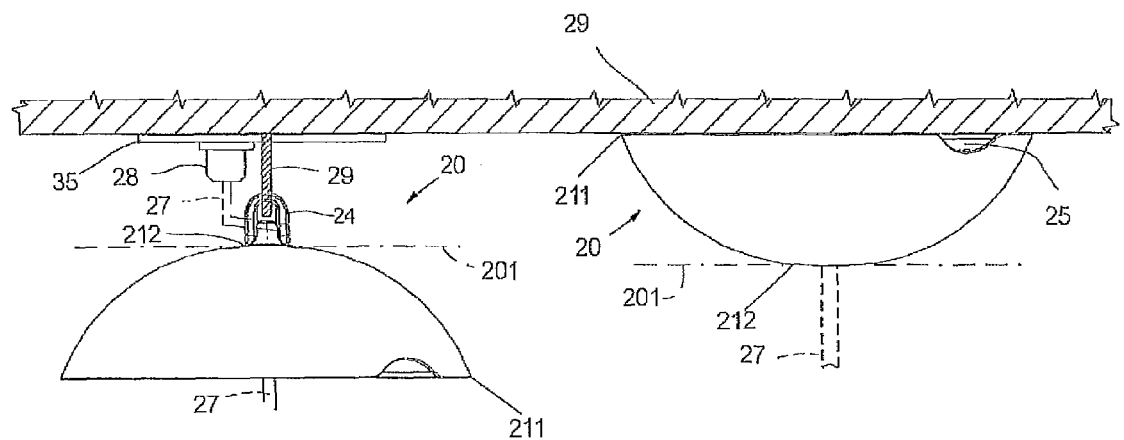
FIGS. 3a and 3b show lateral views of the invention in two states.

The body 21 is made of an elastic and flexible material, such as rubber or soft, flexible plastic, polymer, textiles, silicon polymers or elastic flexible metals. It is important that the material is elastic and flexible in order to be able to fold it at the same time as it keeps its form in both states, in particular in the state as shown in FIG. 3a. The body is also provided with a cut 25 to facilitate entrance of the cable in the body and makes it possible to grip the body to fold it, which will be described below.

The body may be produced in different dimensions but its size in normal cases allows space for remaining cable, i.e. remaining cable which is not used for suspension of the lamp in its full length.

To sum up, the device of the invention is designed to assume two main forms. In a first form turned towards the ceiling, which covers possible socket and hook and a second essentially reversed form. These are illustrated in FIGS. 3a and 3b, respectively.

FIG. 3a shows the cover 20 in a hooked up state (first form) against a ceiling 29. A wire 28, such as a cable, extends from the underside of the cover. The fit of the cover against the ceiling is decided by the length of the hook and attachment device 24, amongst others. However, the body assumes its fit against the ceiling through its elasticity, e.g., if the body's length is longer than the length of the hook attached to the attachment device 24.

FIG. 3b shows the cover 20 in a folded (second) form attached by the attachment device 24 in a hook 28 from the ceiling 29. When installed, the cover 20 is folded in and out by pulling the body 21, e.g. by the slit 25 in the direction essentially from the ceiling. According to this embodiment, the body is folded at the point of attachment 212 to the attachment device 24 and the body 21 is turned around a point of attachment 212 and around a plane 201 at the point of attachment 212. The point of attachment can be inside or outside of the body and can be reinforces partly extending as a part of the body. The reinforcement can be a thickening of the body's attachment to the attachment device 24. Of course, other means than a hook can be used for suspension. The body 21 in its second state maintains its form without a need to hold it and allows free access to the space under the body without holding the body, which results in that a person who installs may e.g. use both his hands.

The hook 29 may be attached to a power outlet 35, in which a plug 28, e.g. attached to a lamp cable 27, can be connected.

The cover can be folded in and out at the initial installation for easier installation work. Here the terms "out and in", and "in and out" refer to the first and second forms respectively, mentioned above. The attachment 24 is essentially centered with respect to the body's circular cross-section.

Figure 4A:
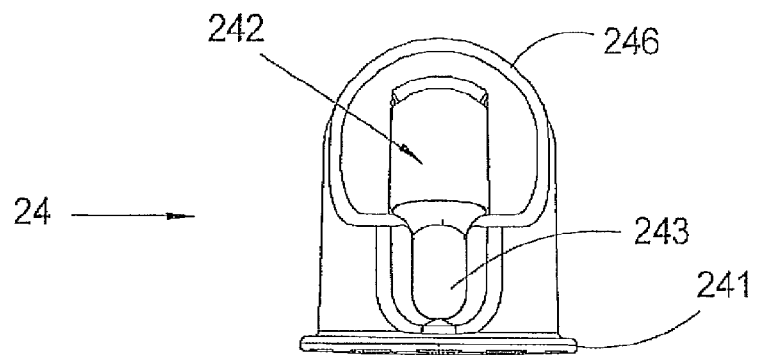
FIGS. 4a to 4c show views of a suspension portion according to the invention.
Figure 4B:
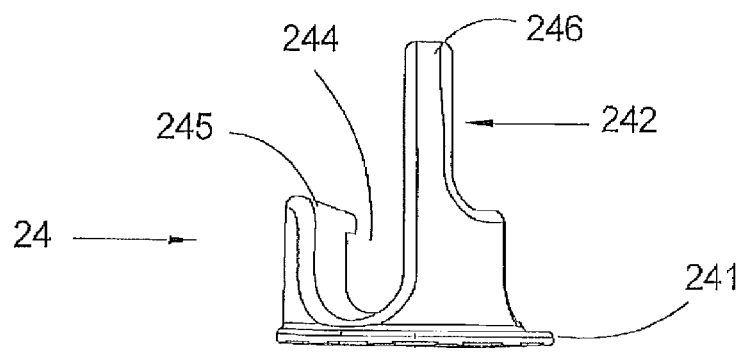
Figure 4C:
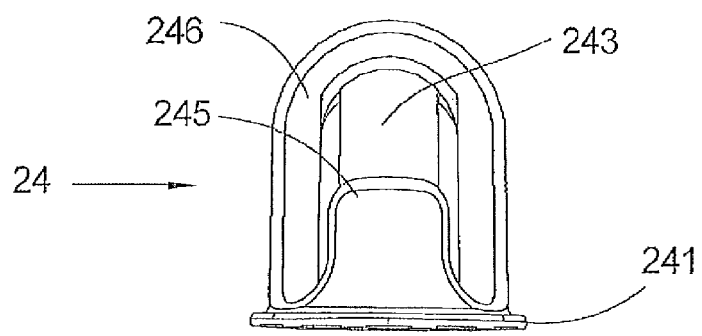

FIGS. 4a to 4c show three views: from the front, from the side and from the rear respectively, of the attachment device 24. The attachment device 24 includes a base section 241, a loop 242, a first grip part 243 and a second grip part 244. Preferably, the attachment device is made of a more rigid material than the body.

Through the base section 241 the attachment device 24 is attached to the body 21. The loop 242 is intended to be used for attachment to a hook. The first grip portion 243 is a tapering of the loop 242 and can be used to insert a cable in the same and fix the cable by means of friction. Also the other grip portion 244, which is formed between a tongue 245 and the body 246 of the loop, can be used to hold the cable. A step on the tongue 245 assures that the cable does not detach.

Consequently, grip parts allow fixing but also make it possible to adjust the length of the cable in a simple way. Of course, other means than only friction may be used to keep the cable in position, such as e.g. screw, staple, Velcro® fastening, or similar.

Figure 5:
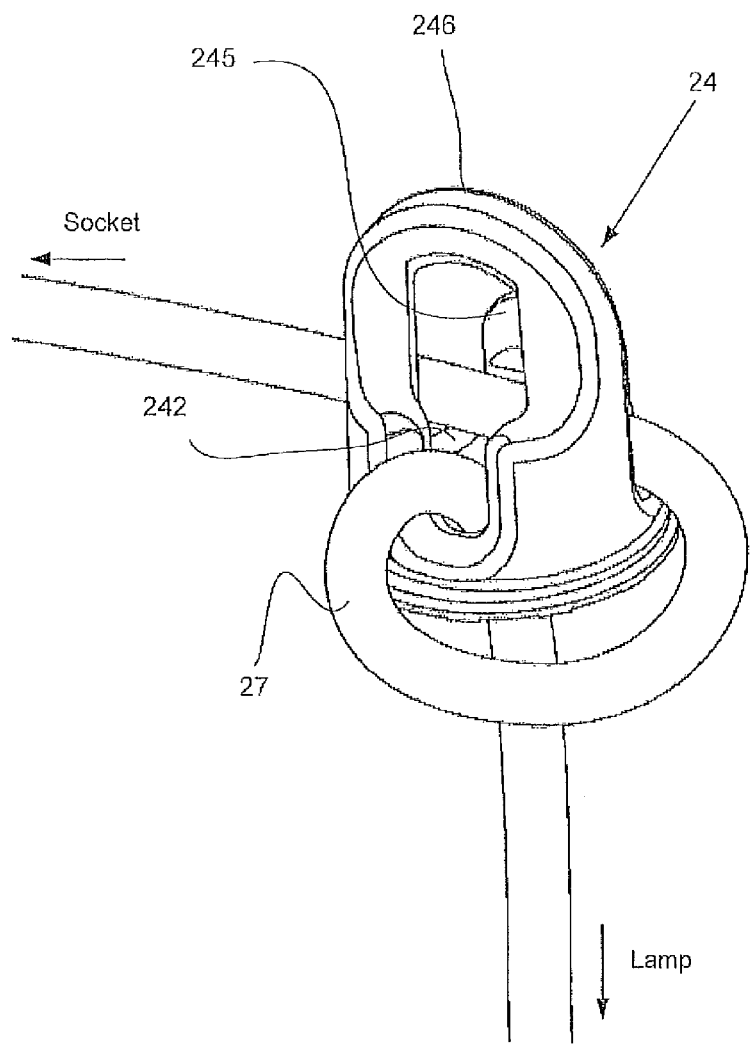
FIG. 5 shows in perspective a mean in accordance with the invention for fixing a wire.

FIG. 5 shows how the attachment device 24 according to this example can hold a cable 27. The cable 27 is inserted between the tongue 245 and the body of the loop 246 and then the cable is turned and entered through the first grip part 242 and then in, through an opening in the base section of the attachment device.

Of course, the cover can be used only to cover sockets or other elements on the ceiling, wall or a suitable place. According to one embodiment, the cover may be provided with removable attachment device which can be screwed to the body. The length of the attachment device may be varied for different applications. The cover may have different forms and design as long as its function is maintained. The cover may for example be conical, cubic or similar. The cover may be provided with a pattern and manufactured in different colors.

The entire cover can be produced in one part, for example through double injection-mould. Thanks to the production adapted design no movable tool parts are needed. Of course, other production methods may be used.

The invention is not limited to the illustrated and described embodiments. It may be varied in different ways within the scope of the attached claims.

The invention claimed is:

1. A device for covering an area, said device comprising an attachment portion and a body, wherein said body is formed as a sphere section made of a flexible material and designed as a cover with a wall essentially extending around the entire cover, which has an open end portion, that said wall extends from an end point to said end portion, which end portion is configured to assume a first position with regard to a plane in said end point of said cover and a second position by folding said wall and displacing said end portion past said plane.

2. The device according to claim 1, wherein the material is one or several of rubber, plastic, polymer, textiles, silicon polymer or elastic flexible metal.

3. The device according to claim 1, comprising an attachment part.

4. The device according to claim 3, wherein said attachment part comprises a loop.

5. The device according to claim 3, wherein said attachment part comprises a fixing portion.

6. The device according to claim 3, wherein said fixing portion is arranged to hold a cable by means of friction.

7. The device according to claim 4, wherein the loop is arranged to interact with a hook for suspension.

8. The device according to claim 1, wherein said body assumes a first and a second operational positions, and said first and second operational positions are substantially inverted.

9. The device according to claim 1, wherein said device is a cover.

10. The device according to claim 1, wherein said device is a lamp top.

11. A method for covering an area provided with an attachment by means of a device according to claim 1, wherein said body is folded past said plane, that said attachment part on said device is attached to said attachment and said body is folded back to an initial position.

12. A method to suspend an electric device by means of a device according to claim 1, wherein said body is folded close to or past said plain, that said attachment part on said device is attached to an attachment, a wire of said electric device is inserted through a holder and fixed, and said body is folded back to an initial position.

* * * * *

UNITED STATES PATENT AND TRADEMARK OFFICE
CERTIFICATE OF CORRECTION

PATENT NO. : 8,182,121 B2
APPLICATION NO. : 12/984111
DATED : May 22, 2012
INVENTOR(S) : Jonas Karl Forsman and Lars S E Wettre It is certified that error appears in the above-identified patent and that said Letters Patent is hereby corrected as shown below:

On the Title page please add the following:

Item (30) Foreign Application Priority Data
July 11, 2008   (SE)    0801675-0

Signed and Sealed this
Tenth Day of July, 2012

David J. Kappos
*Director of the United States Patent and Trademark Office*